Aug. 10, 1937.  F. L. LINDSTROM  2,089,388
MOTION PICTURE PROJECTOR
Filed Aug. 8, 1935  2 Sheets-Sheet 2
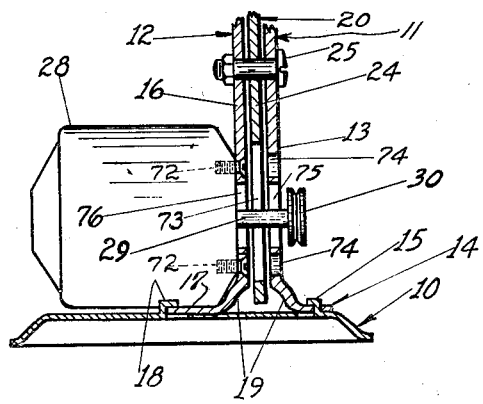
FIG. 4
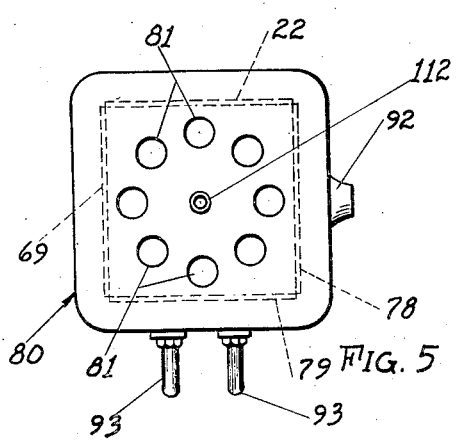
FIG. 5
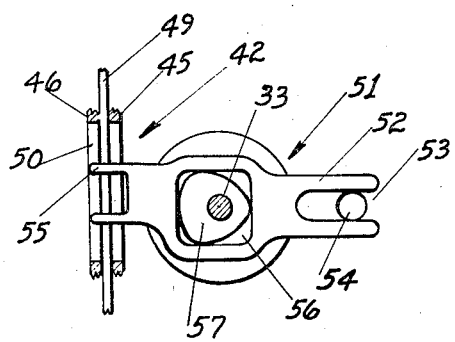
FIG. 6
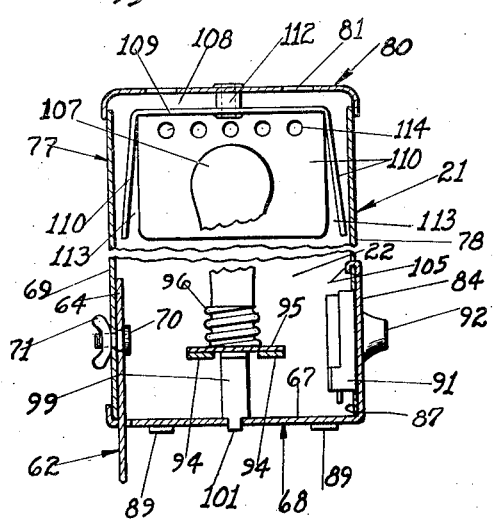
FIG. 7
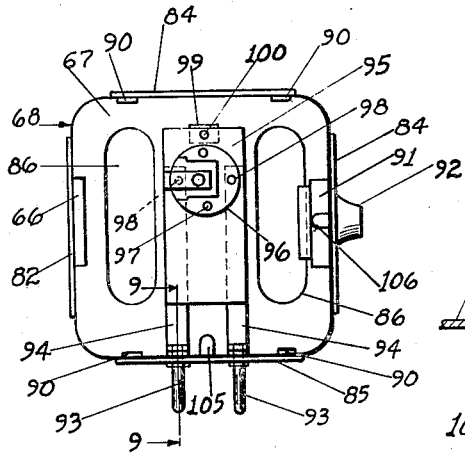
FIG. 8
FIG. 9
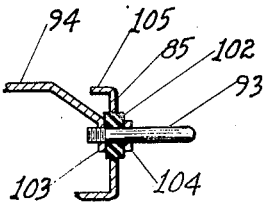
FIG. 10
INVENTOR
FRANK L. LINDSTROM
BY John A. Hanrahan
ATTORNEY Patented Aug. 10, 1937

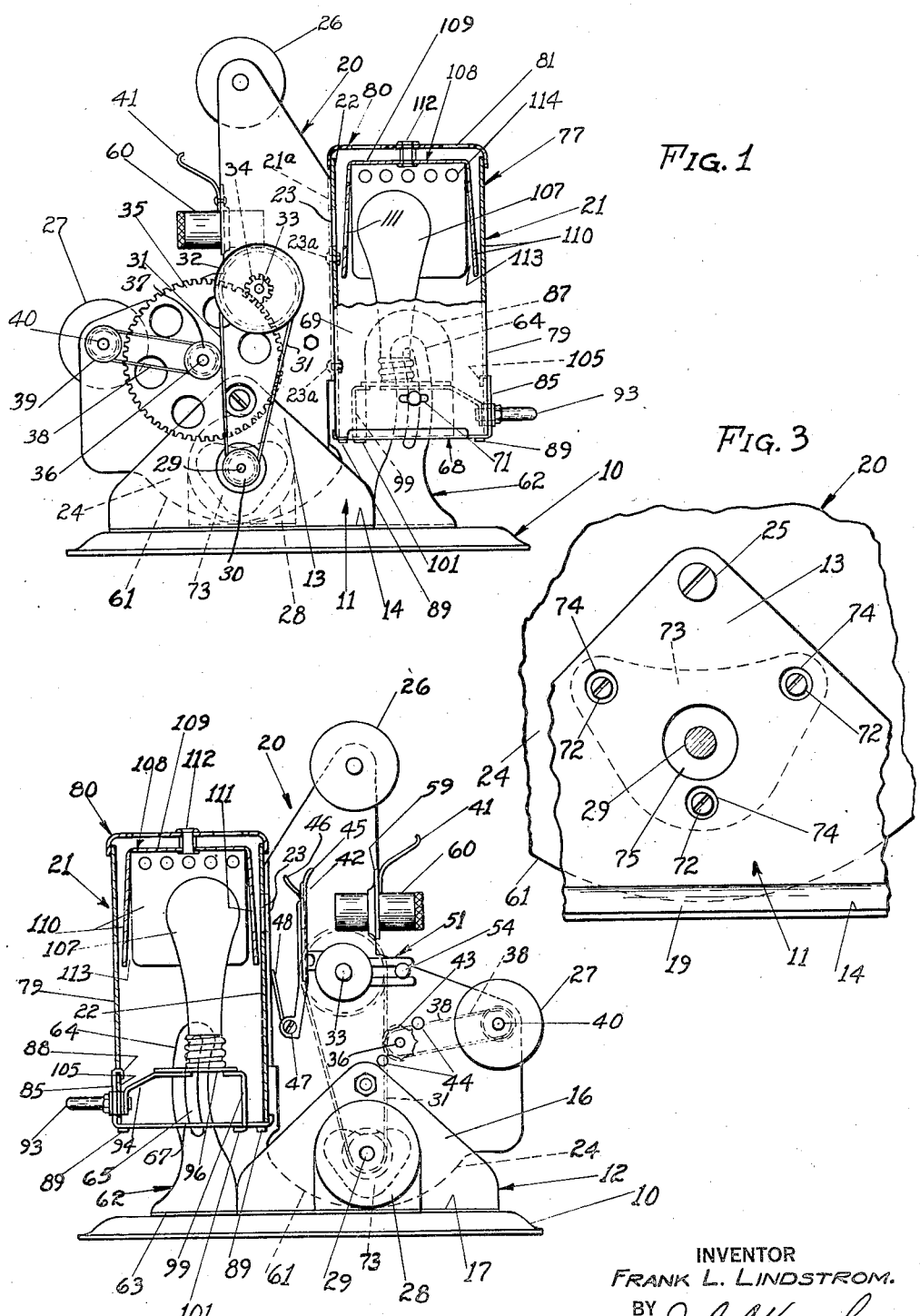

2,089,388

UNITED STATES PATENT OFFICE 2,089,388

MOTION PICTURE PROJECTOR

Frank L. Lindstrom, Bridgeport, Conn.

Application August 8, 1935, Serial No. 35,269

10 Claims. (Cl. 88—24)

This invention relates to new and useful improvements in motion picture projectors and relates particularly to such projectors as are manufactured for home use.

An object of the invention is to provide a projector which may be inexpensively manufactured and which is of rigid construction and wherein the machine frame and parts carried thereby may be easily adjusted as about a horizontal pivot, so as to project an image higher or lower on a wall or screen, and then securely locked in the desired position of adjustment.

Another object is to provide a projector of the kind indicated and including an improved baffle or heat absorbing means to keep the lamp box, and particularly the upper portions and top thereof, from becoming excessively hot.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 1 is a rear side elevational view of the present machine, the upper portion of the lamp box being broken away;

Fig. 2 is a front side elevational view of the machine the lamp box being shown in section;

Fig. 3 is an elevational view on an enlarged scale and showing portions of the rear frame support;

Fig. 4 is a sectional view through the lower portion of the frame and the frame supports and showing the manner of mounting the motor;

Fig. 5 is a top plan view of the lamp box alone;

Fig. 6 is an elevational view showing the film feeding means;

Fig. 7 is a sectional view through the lamp box, the view being taken at right angles to Fig. 2;

Fig. 8 is a top plan view of the box bottom showing the same before assembly with the box;

Fig. 9 is a detail sectional view taken substantially along the line 9—9 of Fig. 8; and Fig. 10 is a detail sectional view showing a slightly modified form of heat baffle and light reflector.

Referring in detail to the drawings the improved machine is shown as including a base 10 pressed up from sheet metal and carried by and extending upwardly from such base are a pair of frame supporting members 11 and 12 respectively. The member 11 includes an upstanding substantially triangular portion 13 and a horizontally disposed portion 14, the latter being arranged on the upper side of the base 10 and being secured to the base as by lugs 15 struck from the base and passed upwardly through the porion 14 and clinched thereagainst.

Somewhat similarly the member 12 includes a vertically extending substantially triangular shaped portion 16 and a horizontally disposed portion 17 arranged on the upper surface of the base and secured in place by lugs 18 lanced from the base and passed upwardly through the portion 17 and clinched thereagainst as shown in Fig. 4. At the junctures of their vertical and their horizontal portions the frame supports 11 and 12 have reversedly bent portions 19 whereby the frame supports are extremely rigid and from Fig. 4 it will be noted that the supports are arranged with their vertical portions spaced apart.

Pivotally mounted by the supports 11 and 12 is a frame 20 carrying the projecting apparatus and also carrying a lamp box 21. Frame 20 is of sheet metal and has a vertical edge portion bent to provide a flange 21a disposed against the front wall 22 of the lamp box and secured thereto in any suitable manner as by bolts 23a or the like. Through this flange 21 and the front wall of the lamp box there are registering openings 23 providing for the passage of light from the interior of the lamp box. While the projecting apparatus is on the upper portion of the frame 20 the latter includes a lower plate-like extension 24 disposed between the vertical portions of the frame supports 11 and 12 and as best shown in Fig. 4 having a sliding fit between such portions whereby there will be no relative lateral movement. A bolt or other means 25 passes through the supports 11 and 12 and the plate-like extension 24 of the frame so as to pivotally mount the latter on the supports.

On the frame 20 are upper and lower film reels 26 and 27 of which the latter is in the present instance driven by a motor 28 having a shaft 29 extending through the supports 11 and 12 and the plate-like portion 24 of the frame and carrying a pulley 30 over which is trained a belt 31 driving a relatively large pulley 32 on the shaft 33 with a small gear 34 meshing with and driving a large gear 35 on the shaft 36. Also, on the shaft 36 is a pulley 37 which through an elastic belt 38 drives a pulley 39 on the shaft 40 with the lower film reel 27.

The film from the reel 26 is carried down over a guide 41 and then through a film gate 42 after which the film is passed around a sprocket 43 against which it is held by guide pins 44 and then onto the lower reel 27. Sprocket 43 is on the shaft 36 and will, of course, be driven with said shaft. Gate 42 comprises a fixed front gate section 45 and a movable rear gate section 46 pivoted at 47 and held against the section 45 by a clothes pin-like spring 48, the intermediate portion of which is wrapped about the pivot 47. Obviously, the film passes between the gate sections 45 and 46 and in Fig. 6 a section of film is shown at 49 as passing between the gate sections 45 and 46.

As shown best in Fig. 6 the gate sections are provided with longitudinally extending registering slots 50 and means are provided and which extending through said slots are actuated to feed a film. This film feeding means generally designated 51 is shown more particularly in Fig. 6 and comprises a member 52 provided in one end with a slot 53 through which extends a guide pin 54 carried by the frame 20. At its other end the member 52 is forked or provided with a pair of fingers or prongs 55 and in its intermediate portion the member is provided with an opening or slot 56 in which is located a cam 57 carried by the shaft 33 on which is mounted the pulley 32 and the small gear 34 above referred to. It will, therefore, be apparent that while the motor 28 is operating the cam 57 will be rotated and the member 52 being mounted for a sliding movement toward and from the gate 42 and also being capable of a certain limited vertical movement such movements will be imparted to the member by the cam as the latter is rotated. The fingers 55 of the member extend into the slot 50 of the gate sections and through the usual perforations in the edge portion of the film 49.

The fingers 55 of the member 52 are spaced apart the same distance as a pair of the perforations of the film and as the cam is rotated the pronged end of the member 52 is raised slightly and then the member is moved forwardly to carry its prongs inwardly through the slot 50 in the gate and into a pair of the usual perforations in the edge portion of the film. Continued movement of the cam in the same direction next results in the pronged end of the member 52 being moved downwardly a distance equal to the distance between a pair of the perforations in the film. As rotation of the cam continues the member 52 is next shifted outwardly with respect to the gate so as to withdraw the fingers 55 from the perforations in the edge portion of the film and thereafter, movement of the cam continuing, the member 52 is advanced toward the film to enter the next uppermost pair of perforations and again feed the film downwardly. The described action is repeated until the film has been fed its entire length.

At its forward edge the frame 20 carries a flange 59 providing a mounting for the guide 41 and also providing a mounting for a tubular member 60 within which are located any or the usual lenses (not shown). Obviously, the member 60 may be shifted forwardly or rearwardly through the flange 59 for proper focusing.

The frame 20 and all the parts carried thereby are adapted to be rocked about the bolt 25 as a pivot so as to have the machine project an image higher or lower on a wall or screen or the like. To prevent a binding action the lower edge 61 of the plate-like portion 24 of the frame is arcuate as shown in Figs. 1, 2, and 3 and the center of the radius of this edge is the bolt 25. After an adjustment has been made by rocking the frame about the pivot 25 a separate means is provided for locking the parts in the adjusted position.

This last means includes a bracket 62 having a base portion 63 secured to the base 10 and also including a vertical or upstanding portion 64 having an arcuate slot 65 therein the center from which said slot is struck being also the center of the pivot or bolt 25. The vertical bracket portion 64 extends upwardly through a slot 66 in the lower wall 67 of a bottom member 68 later to be described. Such bottom member is rigidly secured to and forms part of the lamp box 21, and as the bracket extends into the lamp box its vertical portion lies against one side wall 69 of the lamp box. Such wall is provided with an opening and a bolt 70 extends through the slot 65 of the bracket and the opening in the wall of the lamp box and at the outer side of the lamp box a wing nut or the like is threaded on said bolt. Obviously, on loosening of the nut 71 the frame 20 and all the parts carried thereby may be rocked on the bolt 25 as a pivot and the bolt 70 will move with the lamp box since the bolt may be moved along the slot of the bracket and thereafter the nut 71 is screwed tight so as to secure the parts in adjusted position.

The bracket 62 provides means for obtaining a very rigid structure while permitting the use of light gauge metal throughout the device. When the wing nut 71 is tightened the frame and all parts carried thereby are held against lateral movement since the frame is then secured at two points, the bolt 25 and the bolt 70, and since the machine frame includes the plate-like portion 24 having a sliding fit between the supporting members 11 and 12. Further, owing to the use of the bracket the supporting members 11 and 12 need not be drawn tight against the frame so that the frame may have a free pivoting movement about the bolt 25. This is true since the bracket with the bolt 70 and nut 71 provide a sturdy lock for positively holding or clamping the assembly in the desired position of adjustment. Since the described construction permits of the use of light gauge metal while at the same time providing a sturdy and rigid construction it will be appreciated that the expense of manufacture is greatly reduced.

The motor 28 is secured to the vertical portion 16 of the frame supporting member 12 by screws 72 (see Fig. 4) passing through the supporting member from the inner side thereof. The plate-like portion 24 of the frame 20 has a large opening 73 therein and which opening (see Fig. 3) is of such size as to expose all three of the screws 72 securing the motor to the member 12. The motor shaft 29 passes through the opening 73. Supporting member 11 has three openings 74 aligned with the screws 72 and the vertical portions of the supporting members 11 and 12 are provided with relatively large openings 75 and 76 and these last openings are in fact of diameters slightly greater than the diameter of the pulley 30.

With the described construction when the motor is to be removed for repairs or replacement the frame is shifted so as to bring the opening 73 in its lower portion substantially into the position of Fig. 3 and thereafter a screw driver may be passed through the openings 74 and the opening 73 to release the screws 72. Following this the motor may be removed from the machine by drawing it laterally, its pulley 30 passing through the opening 75 of support 11, the opening 73 of the frame and the opening 76 of the support 12. Thus the motor may be removed without disturbing any of the other parts and it will be apparent that the motor may be again secured in place without disturbing other parts of the machine. Further, the large opening 73 in the frame provides for the rocking adjustment of the frame without interference from the motor shaft.

The lamp box 21 includes a rectangular body member 77 which in addition to the side wall 69 comprises a second side wall 78, the front wall 22 and a rear wall 79. Such body member is open at both ends and its upper end is normally closed by a removable cover 80 having vent openings 81 in its top side for the escape of heat. The bottom member 68 closes the lower end of the body 77 and such member in addition to its bottom wall 67 includes vertical flanges 82, 83, 84 and 85 and in its bottom wall is provided with relatively large openings 86 for the admission of air to the body. The air so admitted moves upwardly through the body as will later be more fully described and escapes through the openings 81 in the removable cover.

Body 77 in its side wall 78 is provided with a relatively large opening 87 extending through the lower end of the body and in its rear wall the body is provided with an opening 88 extending through its lower end. Further, the front and rear wall members at their lower ends carry lugs 89 which are passed through openings 90 from the bottom wall of the member 68 and then clinched over. This comprises a part of the means for securing the bottom member 68 to the body 77 of the lamp box. When the parts are assembled the flanges 82 and 83 simply embrace the lower edge portions of the side 69 and the front 22 of the body of the box while the flanges 84 and 85 serve to mount certain parts as will be described and also close the openings 87 and 88 in the side and rear wall of the body 77.

The flange 84 mounts a rheostat 91 and preferably such flange is clamped between the rheostat and its operating knob 92 as shown best in Fig. 7. Mounted on the flange 85 are a pair of contact prongs 93 each connected with a conductor strip 94 and which strips mount a sheet 95 of insulating material supporting a lamp receptacle 96. Such receptacle is secured to the sheet 95 as by rivets 97 and additional rivets secure the receptacle to the sheet 95 and make contact with the conductors 94 and also secure the latter to the sheet. A brace-like member 99 is riveted to the sheet 95 at 100 and includes a reduced portion 101 passing through the wall 67 of the member 68 and clinched over.

Fig. 9 shows the manner of mounting one of the contact prongs 93 although it will be understood that they are both mounted in the same manner. A block of rubber 102 is wedged in an opening in the flange 85 and the prong passes through such block and at the inner side thereof is threaded into a vertical portion 103 of the conductor 94 and at the outer side of the block a nut 104 is threaded on the prong 93. By tightening the nut the portion 103 is drawn against the inner side of the block 102 so that the parts are securely mounted. Obviously block 102 need not be of rubber, but may be of any other desired insulating material.

At its upper edge flange 85 carries a lug 105 which is passed through an opening in the rear wall of the lamp box body and clinched as shown in Figs. 1 and 2. Similarly a lug 106 is carried at the upper edge of the flange 84 and passing through the side wall 78 of the box above the cutout or opening 87 is clinched as best shown in Fig. 7. When the lug 89 and the lugs 105 and 106 are clinched as described the member 68 is securely fastened to the body of the lamp box. Any or the usual lamp 107 is threaded into the receptacle 96 to provide the light necessary to reproduce the film.

With the construction described prior to the assembly of the lamp box body 77 and the bottom member 68 the various parts comprising the rheostat 91, the contact prongs 93 and the lamp base 96 and its support and conductor members are all assembled on the said bottom member 68. Thus, it will be seen that the various parts may be assembled on the bottom member 68 while the same is free of the lamp box and easily accessible. Thereafter, the body 77 may be lowered or set into the member 68 since the openings 87 and 88 in the body will accommodate the rheostat and the mountings for the contact prongs 93, the said openings passing through the lower end of the lamp box body and permitting it to be lowered into the member 68.

In the upper portion of the lamp box is a combined heat baffle and light reflector generally designated 108. This member is shown as formed from a single piece of metal including a top wall 109 and side walls or wings 110 of which the front one is provided with an opening 111 aligned with the openings 23 previously referred to. A rivet or other means 112 connects the member 108 to the removable cover 80 and it will be noted that the arrangement is such that the top wall of the member is spaced below the perforated top of the cover and that the wings of the member are disposed about the light bulb 107 between the latter and the walls of the box body 77. The wings 110 of the member 108 are not connected with one another along their vertical edges and in fact flare outwardly slightly thereby providing opening or cracks 113 at the corners of the member.

When the machine is in use air enters the lamp box through the openings 86 in the bottom wall of the member 68 and passing upwardly through the lamp box escapes through the openings 81 in the removable cover 80. The member 108 as here disclosed serves to prevent the upper portion of the lamp box and particularly the cover 80 from becoming excessively hot. It baffles the upwardly moving air stream and holds it away from the portions of the lamp box about the bulb 107 and the air from about the bulb is permitted to escape slowly through the cracks or openings 113 at the edges of the wings 110 of the baffle. If desired, additional openings 114 may be provided in the wings 110 adjacent their upper ends.

As disclosed the member 108 is formed of tin plate so that all of its surfaces are bright light reflecting surfaces. To improve the concentration of the light beam on a film in combination with increased efficiency due to reduction in light waves which would normally be reflected from all sides of the bright surfaced baffle of the type shown in Figs. 1 through 9 an alternate construction embodies the use of a dull finish metal as black iron for the baffle and the use of a bright concaved reflector 115 as in Fig. 10. There the baffle is generally designated 116 but aside from the fact that it is made of black iron or similar dull finish metal and carries the concaved reflector 115 at the inner side of its rear wing it is of the same construction as the baffle 108. Where the light problem is not so critical the construction may be as disclosed in Figs. 1 through 9.

Ordinarily the baffle is not provided with the openings 114 since the extremely hot air escapes through the cracks 113 but these openings may be provided when a large lamp is used. The baffle serves to reflect light onto the film being projected and also prevents light showing through the vent holes 81 in the cover 80. Further, the baffle absorbs and dissipates heat preventing the upper portion of the lamp box from becoming excessively hot.

When the machine is of the hand driven type the motor 28 is, of course, omitted and then the shaft 26 is continued beyond the sprocket 43 and bent to provide a crank or a crank is attached to the shaft at the outer side of said sprocket so that the necessary movement may be imparted to the various parts of the apparatus. With such a construction the pulley 32 acts as a fly wheel to smooth out the movement if the operator does not turn the crank with a steady motion. Further, in the hand operating machine when the film is to be rewound the elastic belt 38 may be removed from the pulley 37 and applied to the high speed pulley 32 so as to drive the shaft 40 at a high speed to rewind the film. It will be understood that in the hand type machine the belt 31 will not be in place and that the elastic belt 38 may, therefore, be stretched to extend over the pulley 32.

Having thus set forth the nature of my invention, what I claim is:

1. In a motion picture projector, a sheet metal base, inner and outer sheet metal frame supports secured in slightly spaced relation to said base toward the rear side thereof and extending upwardly therefrom, a sheet metal frame pivotally mounted on said supports and including a plate-like portion between and having a sliding fit with them, projecting apparatus on said frame and including a driving pulley at the rear side thereof, a motor on said base at the inner side of the inner frame support, said frame supports and plate-like portion of the frame having aligned openings therethrough, a shaft from said motor extending through said openings, a pulley on said shaft at the rear side of the outer frame support, a driving connection between the pulley on the frame and said pulley, means passing through the inner frame support and securing the motor thereto, and said openings through the frame supports and the plate-like portion of the frame of a size to permit of movement of the motor shaft carried pulley therethrough when assembling the motor on the base or when removing it therefrom.

2. A motion picture projector comprising an elongated base, a frame support comprising a plate rigid with said base and extending upwardly therefrom toward the forward end thereof, a frame comprising a plate, means comprising a horizontal pivot securing the lower portion of the frame to the support for pivotal movement relative thereto, film mounting and feeding means on said frame, a lamp box, means rigidly securing the forward wall of said lamp box to the rear edge of said frame whereby the lamp box is located over the rear portion of the base, a brace comprising an upstanding arm rigid with the rear portion of the base and extending along a wall of the lamp box and having a longitudinally extending slot therein, a bolt extending through the said slot and the wall of the lamp box, and a nut on the bolt and operable to clamp the brace against the wall of the lamp box to lock the latter and the frame in the desired position of adjustment about said pivot.

3. In a motion picture projector, a lamp box comprising a hollow member having an air inlet opening at its lower end, a removable cover on the upper end of said member and including a top wall, a lamp in said member, a baffle including a plate spaced below the top wall of said cover and located over said lamp, said plate having its broadside toward the lamp and of such area that it extends beyond all sides thereof, means securing said plate to the top wall of the cover, and wings carried by and depending from the edges of said plate and extending into positions at the sides of said lamp but spaced therefrom and from the sides of the hollow member.

4. In a motion picture projector, a lamp box comprising a hollow member having an air inlet opening at its lower end, a removable cover on the upper end of said member and including a top wall, a lamp in the member, a baffle plate spaced below and extending parallel with said top wall and disposed over said lamp and extending laterally thereof, means securing the plate to the top wall of the cover, wings carried by said plate and depending from the edges thereof and extending into positions at the sides of the lamp but spaced therefrom and from the sides of the hollow member, and said wings adjacent said baffle plate having perforations for the escape of hot air from the baffle.

5. In a motion picture projector, a lamp box comprising a hollow member having an air inlet opening at its lower end, a removable cover on the upper end of said member and including a top wall, a lamp in said member, a baffle plate spaced below the top wall of the cover and extending over said lamp and laterally beyond the sides thereof, means securing the baffle plate to the top wall of the cover, wings carried by said plate and depending from the edges thereof and extending into positions at the sides of the lamp but spaced therefrom and from the sides of the hollow member, and said wings disposed with their adjacent vertical edges free of one another to provide for the escape of hot air from the baffle.

6. In a motion picture projector, a lamp box comprising a hollow member having an air inlet opening at its lower end, a removable cover on the upper end of said member and including a top wall, a lamp in the member, a baffle plate spaced below and extending parallel with said top wall and disposed over said lamp and extending laterally thereof, means securing the plate to the top wall of the cover, and wings carried by said plate and depending from the edges thereof and extending into positions at the sides of the lamp but spaced therefrom and from the sides of the hollow member.

7. In a motion picture projector, a lamp box comprising a hollow member having an air inlet opening at its lower end, a removable cover on the upper end of said member and including a top wall, a lamp in said member, a baffle plate spaced below the top wall of the cover and extending over said lamp and laterally beyond the sides thereof, means securing the plate to the top wall of the cover, wings carried by said plate and depending from the edges thereof and extending into positions at the sides of the lamp but spaced therefrom and from the sides of the hollow member, and said plate and wings having bright light reflecting inner surfaces.

8. In a motion picture projector, a lamp box comprising a hollow member having an air inlet opening at its lower end, a removable cover on the upper end of said member and including a top wall, a lamp in said member, a baffle plate spaced below the top wall of the cover and extending over said lamp and laterally beyond the sides thereof, means securing the plate to the top wall of the cover, wings carried by the plate and depending from the edges thereof and extending into positions at the sides of the lamp but spaced therefrom and from the sides of the hollow member, and a light reflector carried by the rear wing of said baffle.

9. In a motion picture projector, a lamp box comprising a hollow member open at its lower end and having an opening in its front wall, said member having an opening in a wall and extending through the lower edge of said wall, a bottom for said member comprising a plate-like part having openings therethrough and having a flange engaging a side wall of the member, insulators carried by said flange and extending through the opening in the wall of the member, contacts carried by the insulators and projecting through the same beyond the outer side of the member, other contacts within said member and mounted on said first contacts, an insulator carried by said other contacts, a lamp socket on said insulator and electrically connected with said contacts, and means cooperating with said contacts to rigidly mount said insulator.

10. In a motion picture projector, a lamp box comprising a hollow member open at its lower end, a bottom for said member, a lamp socket and contacts carried by said bottom, a rheostat carried by said bottom, said bottom having an opening therethrough for the admission of air to said member, and means mounting said bottom on said member with said contacts and rheostat located within the member.

FRANK L. LINDSTROM.